United States Patent
Jiang et al.

(10) Patent No.: US 10,151,946 B2
(45) Date of Patent: Dec. 11, 2018

(54) APPARATUS WITH VISIBLE AND INFRARED LIGHT EMITTING DISPLAY

(71) Applicant: MOTOROLA MOBILITY LLC, Chicago, IL (US)

(72) Inventors: Jun Jiang, Lake Zurich, IL (US); Robert T. Love, Barrington, IL (US); Sen Yang, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 254 days.

(21) Appl. No.: 14/447,651

(22) Filed: Jul. 31, 2014

(65) Prior Publication Data
US 2016/0033822 A1     Feb. 4, 2016

(51) Int. Cl.
*G02F 1/1333* (2006.01)
*G02F 1/1335* (2006.01)
*G02F 7/00* (2006.01)

(52) U.S. Cl.
CPC .... *G02F 1/13338* (2013.01); *G02F 1/133602* (2013.01); *G02F 1/133514* (2013.01); *G02F 2001/133614* (2013.01); *G02F 2203/11* (2013.01)

(58) Field of Classification Search
CPC combination set(s) only.
See application file for complete search history.

(56) References Cited

U.S. PATENT DOCUMENTS

| | | | |
|---|---|---|---|
| 7,369,373 B2 | 5/2008 | Gill | |
| 8,350,827 B2 | 1/2013 | Chung et al. | |
| 2008/0074401 A1* | 3/2008 | Chung | G02F 1/1368 345/175 |
| 2009/0109435 A1* | 4/2009 | Kahen | C09K 11/025 356/317 |
| 2009/0114802 A1* | 5/2009 | Kang | G01B 11/25 250/226 |
| 2010/0085727 A1* | 4/2010 | Igarashi | G02F 1/133603 362/84 |
| 2010/0103648 A1* | 4/2010 | Kim | H01L 33/507 362/97.1 |
| 2010/0225616 A1* | 9/2010 | Kiyose | G06F 3/0412 345/175 |
| 2012/0169962 A1* | 7/2012 | Yuki | G01J 1/02 349/61 |

* cited by examiner

*Primary Examiner* — Lauren Nguyen
(74) *Attorney, Agent, or Firm* — Shumaker & Sieffert, P.A.

(57) ABSTRACT

An apparatus can include a display backlight light source configured to emit light. The apparatus can include an infrared and visible light conversion layer optically coupled to the display backlight light source. The infrared and visible light conversion layer can convert light from the display backlight light source to infrared light and at least some visible light to emit the infrared light along with the at least some visible light. The apparatus can include an optical shutter layer optically coupled to the display backlight light source. The optical shutter layer can include a plurality of optical pixel shutters that shutter light from the backlight light source.

16 Claims, 6 Drawing Sheets

APPARATUS WITH VISIBLE AND INFRARED LIGHT EMITTING DISPLAY

BACKGROUND

1. Field

The present disclosure is directed to an apparatus with a visible and infrared light emitting display.

2. Introduction

Presently, devices include displays that display graphics, text, images, videos, and other information. These device include portable electronic devices, cellular phones, smartphones, televisions, smart watches, and other devices that include displays. Some of these devices include separate infrared Light Emitting Diodes (LEDs) that provide infrared light for touch detection. Other devices use only infrared light sources to provide infrared light for displaying information to users wearing special glasses. This allows the devices to display the information without visible light to hide the information from others for secrecy purposes and to operate the device without detection.

Unfortunately, separate infrared light sources add to the cost of such devices. Also, portable display devices have limited space to keep the size of the devices small for user portability. This creates an additional problem because the extra infrared light sources take up extra valuable space on the portable display devices.

Thus, there is a need for an apparatus with a visible and infrared light emitting display.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide an apparatus with a visible and infrared light emitting display. The apparatus can include a display backlight light source configured to emit light. The apparatus can include an infrared and visible light conversion layer optically coupled to the display backlight light source. The infrared and visible light conversion layer can convert light from the display backlight light source to infrared light and at least some visible light to emit the infrared light along with the at least some visible light. The apparatus can include an optical shutter layer optically coupled to the display backlight light source. The optical shutter layer can include a plurality of optical pixel shutters that shutter light from the backlight light source.

Figure 1:
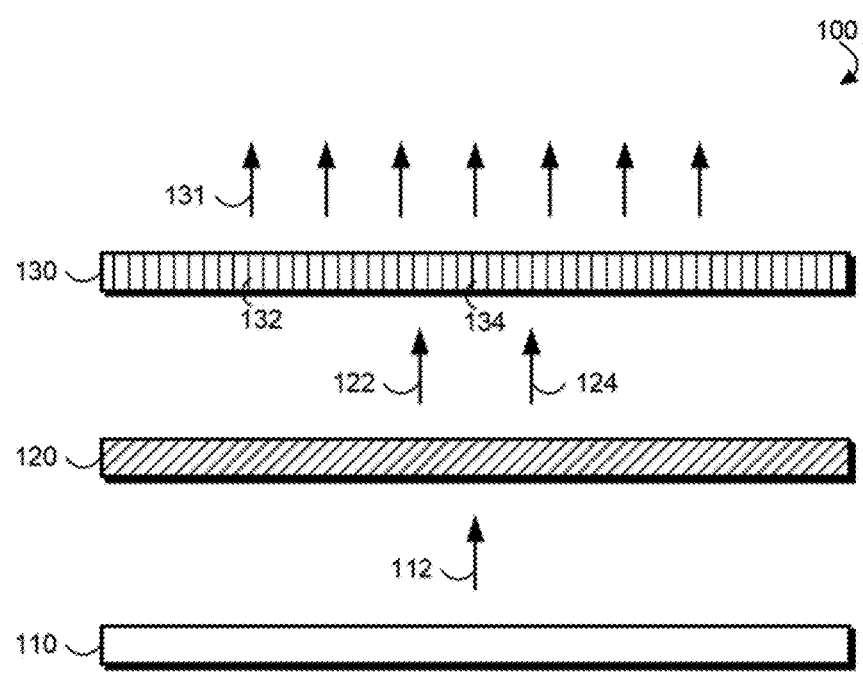
FIG. 1 is an example illustration of an apparatus according to a possible embodiment.

FIG. 1 is an example illustration of an apparatus 100 according to a possible embodiment. The apparatus 100 can be or can be part of a portable electronic device, a user portable radio frequency wireless communication device, a desktop monitor, a television, an electronic billboard, a cellular phone, a smartphone, a tablet computer, a smart watch, or any other device that uses a display. The apparatus 100 can include a display backlight light source 110 configured to emit light 112. The display backlight light source 110 can be a display backlight white light source that emits white light, a display backlight blue light source that emits blue light, a display backlight ultraviolet light source that emits ultraviolet light, or other display backlight light source.

The apparatus 100 can include an infrared and visible light conversion layer 120 optically coupled to the display backlight light source 110. The infrared and visible light conversion layer 120 can convert light 112 from the display backlight light source 110 to infrared light 122. The infrared and visible light conversion layer 120 can also convert or emit light 112 from the display backlight light source 110 for at least some visible light 124 to emit the infrared light 122 along with the at least some visible light 124. The infrared light 122 can be near infrared light, can be light in a range of wavelengths between 750 and 1500 nm, can be light in a range of wavelengths centered at 900 nm with a bandwidth of 200 nm, of can be any other infrared light. For example, the infrared and visible light conversion layer 120 can emit a spectrum of light with peaks in red, green, blue, and infrared wavelengths. As a further example, the visible light 124 converted and/or emitted by the infrared and visible light conversion layer 120 can include red and green light, can include red, green, and blue light, can include red, green, blue, and yellow light, can include cyan, magenta, and yellow light, or can include any other combination of wavelengths of visible light. The infrared and visible light conversion layer 120 can be a quantum dot layer, a phosphor layer, or any other layer that convert light from the display backlight light source to infrared light and at least some visible light. For example, the quantum dots in a quantum dot layer can have different sizes to convert light to different wavelengths. Smaller quantum dots can convert light to smaller wavelengths, such as blue light. Different larger quantum dots can convert light to different higher wavelengths up the visible light spectrum including, in order, green, red, and infrared, as well as other wavelengths, such as cyan, magenta, yellow, and other wavelengths.

The apparatus 100 can include an optical shutter layer 130 optically coupled to the display backlight light source 110. The optical shutter layer 130 can include a plurality of optical pixel shutters, such as shutters 132 and 134, that shutter light 112 from the backlight light source 110 to emit emitted light 131 from the apparatus. The plurality of optical pixel shutters of the optical shutter layer 130 can provide multiple pixels that selectively provide light for a display. For example, the optical shutter layer 130 can be a Liquid Crystal Display (LCD) layer and the optical pixel shutters can be liquid crystal pixels. The optical shutter layer 130 can also be a Micro-Electro-Mechanical Systems (MEMS) layer, an Active Matrix Organic LED (AMOLED) layer, or any other layer that shutters multiple pixels to selectively provide light for elements of a display. According to a possible embodiment, when the optical shutter layer 130 is an AMOLED, the infrared and visible light conversion layer 120 can be on top of the OLED. When emitting the infrared light and visible light, the apparatus 100 can display visible images using the visible light 124. Such images can include text, graphics, icons, pictures, videos, and other visible images. For example, the optical pixel shutters can produce picture elements on the apparatus 100 to produce images from the visible light 124.

There can be intervening elements that influence the light 112 between the backlight light source 110 and the optical shutter layer 130. For example, the infrared and visible light conversion layer 120 can be located in between the display backlight light source 110 and the optical shutter layer 130. Alternately, the optical shutter layer 130 can be located in between the display backlight light source 110 and the infrared and visible light conversion layer 120.

Figure 2:
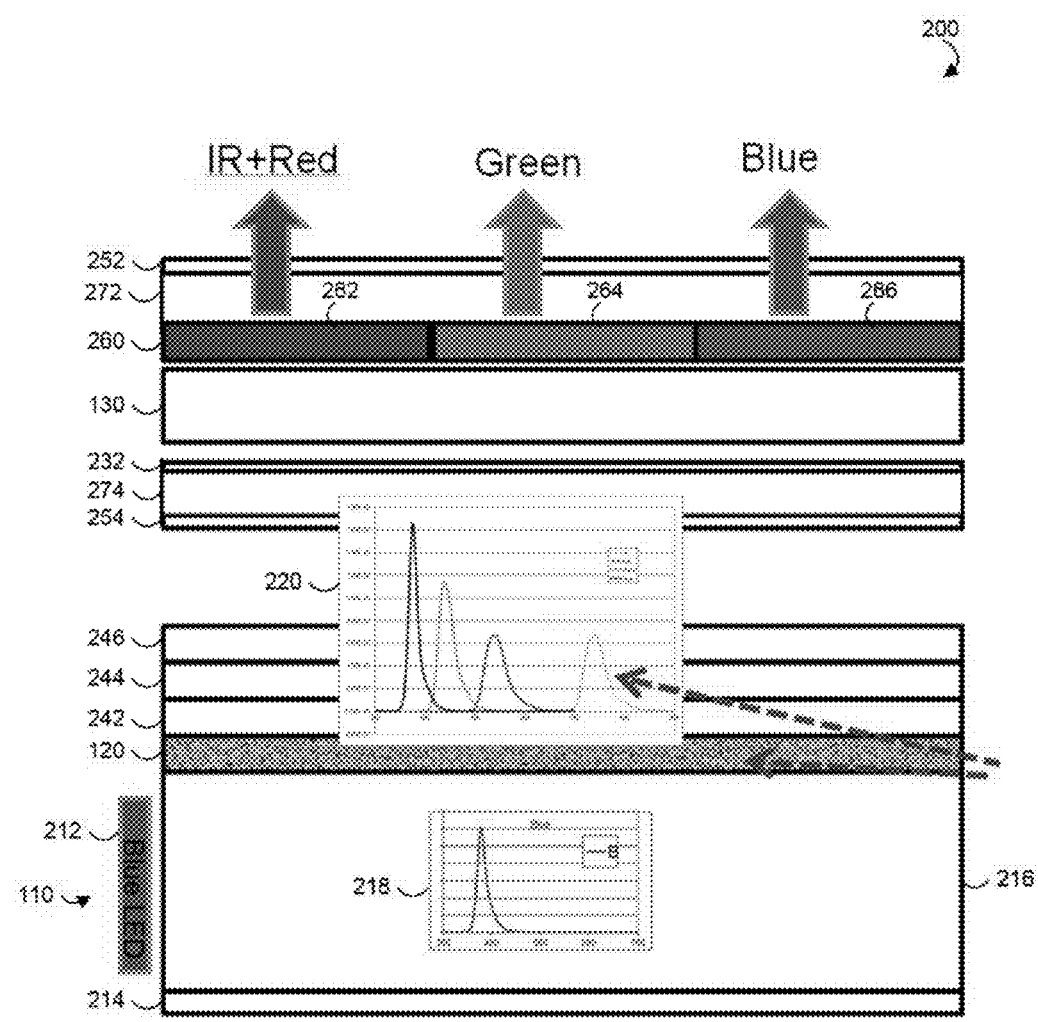
FIG. 2 is an example illustration of an apparatus according to a possible embodiment.

FIG. 2 is an example illustration of an apparatus 200, such as the apparatus 100, according to a possible embodiment. The apparatus 200 can include the display backlight light source 110, the infrared and visible light conversion layer 120, and the optical shutter layer 130. The optical shutter layer 130 can be a liquid crystal display layer or other optical shutter layer. The apparatus 200 can include a switch layer 232 that activates and deactivates the liquid crystals of optical shutter layer 130. The switch layer 232 can be a thin film transistor layer, an indium tin oxide electrode layer, or any other layer than can be used to switch, such as turn on and off, liquid crystals for a display. The display backlight light source 110 can include a blue LED light source 212, a bottom reflector 214, and a light guide panel 216. Alternately, for any of the embodiments, the display backlight light source 110 can include a plurality of light sources behind the infrared and visible light conversion layer 120, can be a Light Emitting Diode (LED) backlighting light source, can be a Cold Cathode Fluorescent (CCFL) backlighting light source, a thin OLED layer that emits a desired light spectrum, or can be any other backlight light source that can provide a backlight for a display, such as a display with an optical shutter layer. The infrared and visible light conversion layer 120 can generate visible light, such as white light, along with infrared light, as shown in the graph 220. For example, blue light 218 from the backlight light source 110 can excite the infrared and visible light conversion layer 120 to generate the visible and infrared light 220. If the display backlight light source 110 is an OLED that emits blue light, the infrared and visible light conversion layer 120 can be an infrared and visible light conversion layer. If the display backlight light source 110 is an OLED emits light with a white spectrum, the infrared and visible light conversion layer 120 can simply be infrared conversion layer, either uniformly or localized, and white light can pass through or past all or some of the layer 120.

The apparatus 200 can also include a first brightness enhancement film 242, a second brightness enhancement film 244, and an upper diffuser 246. The apparatus 200 can further include a front polarizer layer 252, a back or rear polarizer layer 254, a color filter layer 260, a top glass 272, and a bottom glass 274. The front polarizer layer 252 can be optically coupled to the opposite side of the optical shutter layer 130 from the display backlight light source 110 and the back polarizer layer 254 can be optically coupled between the optical shutter layer 130 and the backlight light source 110. Because the polarizer layers 252 and 254 and the liquid crystals in the optical shutter layer 130 can be at least partially transparent near infrared light, the apparatus 200 can emit infrared light regardless of whether the optical shutter layer 130 is turned on or off.

The color filter layer 260 can be optically coupled on an opposite side of the infrared and visible light conversion layer 120 from the display backlight light source 110. The color filter layer 260 can pass infrared light and at least some visible light from the infrared and visible light conversion layer. For example, the color filter layer includes a red light filter 262, a green light filter 264, and a blue light filter 266. The red light filter 262 can pass both red light and infrared light emitted from the infrared and visible light conversion layer 120. While only one of each light filter 262, 264, and 266 is shown, the color filter can include multiple light filters 262, 264, and 266 for multiple pixels of the apparatus 200.

Figure 3:
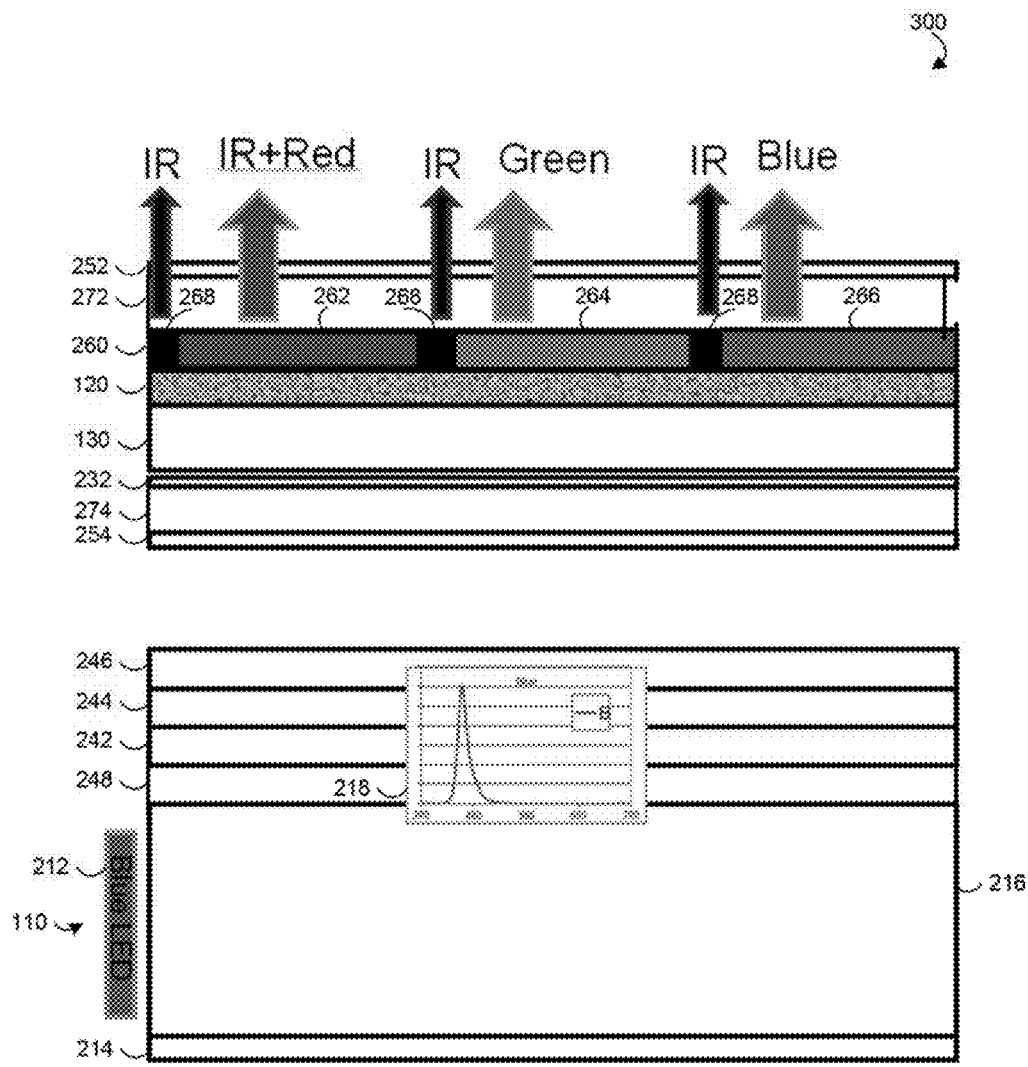
FIG. 3 is an example illustration of an apparatus according to another possible embodiment.

FIG. 3 is an example illustration of an apparatus 300, such as the apparatus 100, according to a possible embodiment. The apparatus 300 can include the display backlight light source 110, the infrared and visible light conversion layer 120, the optical shutter layer 130, and the switch layer 232. The display backlight light source 110 can include the blue LED light source 212, the bottom reflector 214, and the light guide panel 216 to emit light, such as blue light 218. The apparatus 200 can also include the first brightness enhancement film 242, the second brightness enhancement film 244, the upper diffuser 246, and a lower diffuser 248. The apparatus 200 can further include the front polarizer layer 252, the back polarizer layer 254, the color filter layer 260, the top glass 272, and the bottom glass 274.

The color filter layer 260 can include the color filter pixels 262, 264, and 266 and a black matrix 268 that blocks visible light and passes infrared light in between the color filter pixels 262, 264, and 266. The black matrix 268 can pass the infrared light alone or the red color filter 262 can assist in passing the infrared light. Alternately, the color filter layer 260 can include open windows throughout the color filter layer 260 that pass infrared and visible light between the color filter pixels 262, 264, and 266. Additionally, when the infrared and visible light conversion layer 120 is closer to the top of the apparatus 300 as shown, the color filter layer 260 can allow high light transmittance and maximize the overall power efficiency.

Figure 4:
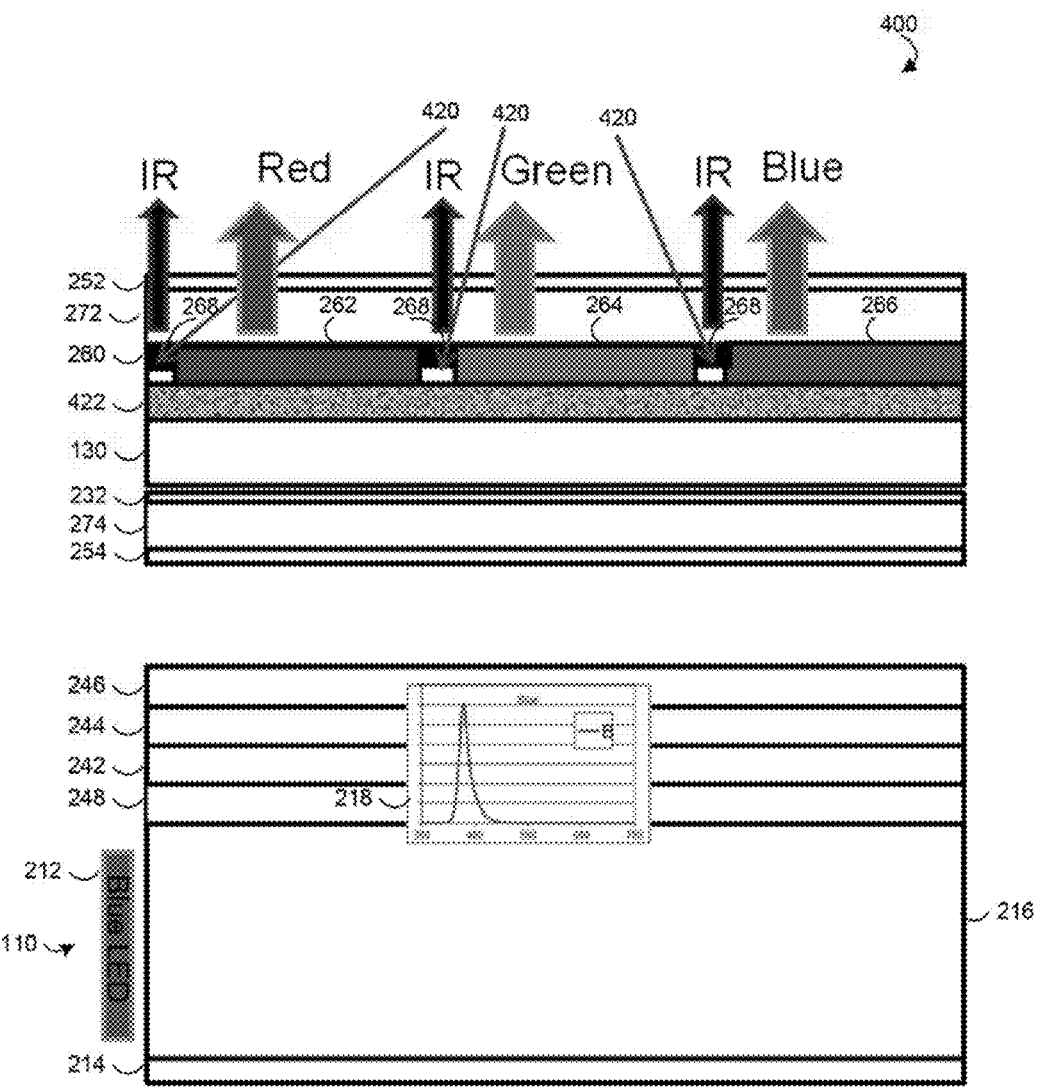
FIG. 4 is an example illustration of an apparatus according to another possible embodiment.

FIG. 4 is an example illustration of an apparatus 400, such as the apparatus 100, according to a possible embodiment. The apparatus 400 can include the display backlight light source 110, the optical shutter layer 130, and the switch layer 232. The display backlight light source 110 can include the blue LED light source 212, the bottom reflector 214, and the light guide panel 216 to emit light, such as blue light 218. The apparatus 200 can also include the first brightness enhancement film 242, the second brightness enhancement film 244, the upper diffuser 246, and the lower diffuser 248. The apparatus 200 can further include the front polarizer layer 252, the back polarizer layer 254, the color filter layer 260, the top glass 272, and the bottom glass 274.

The color filter layer 260 can include the color filter pixels 262, 264, and 266 and the black matrix 268. In this embodiment, the infrared portion of the infrared and visible light conversion layer can be a bottom layer 420 underneath a black ink layer of the black matrix 268. For example, the bottom layer 420 can include infrared quantum dots or phosphors. The visible portion of the infrared and visible light conversion layer can be a quantum dot enhancement film 422. The bottom layer 420 can generate infrared light when excited by light 218 from the display backlight light source 110, such as by a blue component of white light generated or passed by quantum dot enhancement film 422.

Figure 5:
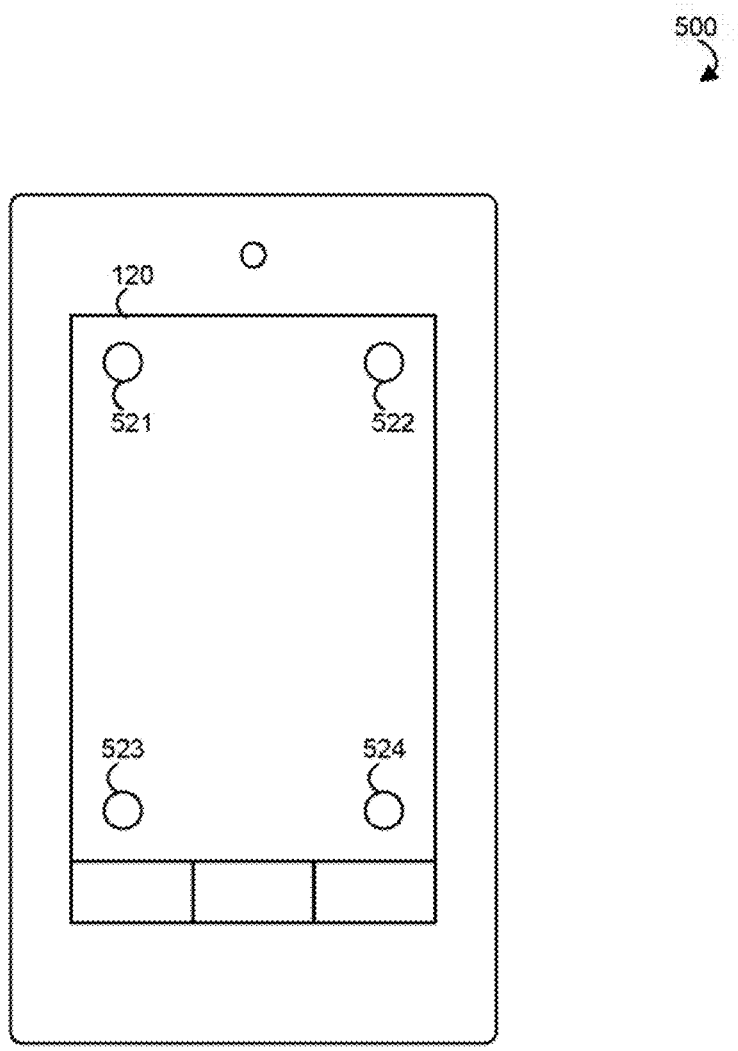
FIG. 5 is an example illustration of an apparatus according to another possible embodiment.

FIG. 5 is an example illustration of an apparatus 500, such as the apparatus 100, according to a possible embodiment. The apparatus 500 can include all of the elements of apparatus 100 and elements from other embodiments with only the infrared and visible light conversion layer 120 shown for simplicity. According to this embodiment, the infrared and visible light conversion layer 120 includes infrared filtering elements 521-524 only at selected locations in the layer 120 to emit infrared light at the selected locations and emit visible light at other locations in the infrared and visible light conversion layer 120. The number of selected locations can be less than ten locations, can be four locations, can be three locations, can be two locations, can be one location, or can be any other number of locations. According to the present embodiment, the infrared filtering elements 521-524 are deposited at four corners of the infrared and visible light conversion layer 120. Infrared light at the different locations 521-524 can be emitted at different times, such as by using optical shutters. For example, infrared light can be emitted at different times to detect user gestures, to scan images or objects, for eye tracking, for different types of infrared illumination, and for other purposes. The infrared light can also be emitted at different times from different locations in the other embodiments using optical shutters.

Figure 6:
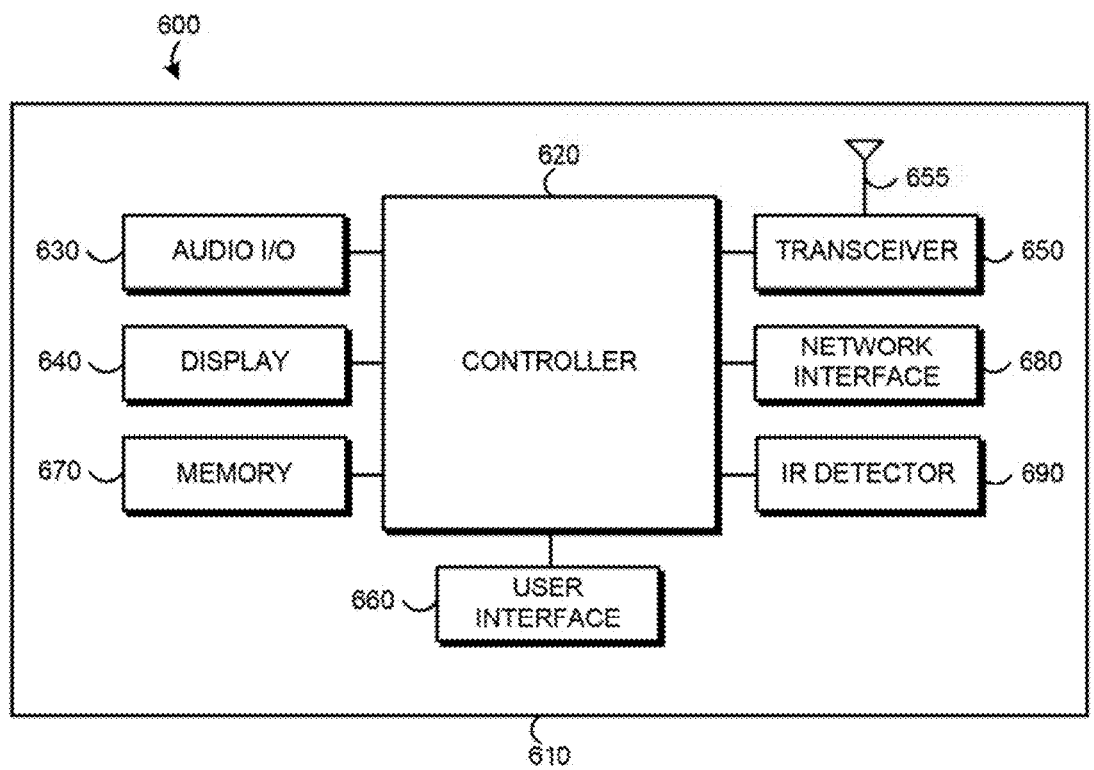
FIG. 6 is an example block diagram of an apparatus according to a possible embodiment.

FIG. 6 is an example block diagram of an apparatus 600, such as the apparatus 110, according to a possible embodiment. The apparatus 600 can include a housing 610, a controller 620 within the housing 610, audio input and output circuitry 630 coupled to the controller 620, a display 640, such as the apparatus 100 that can include elements from other embodiments, coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can also include at least one infrared detector/receiver 690. The at least one infrared detector 690 can be in the display 640 or in an area of the apparatus outside of the display 640. The at least one infrared detector 690 can detect reflected infrared light from the infrared light emitted by the display 640, such as for eye tracking, user gesture detection, pulse oximetry, and other functions.

The transceiver 650 may include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a camera, a touch screen display, another additional display, or any other device useful for providing an interface between a user and an electronic device. The network interface 680 can be a universal serial bus port, an Ethernet port, an infrared transmitter/receiver, an IEEE 1394 port, or any other interface that can connect an apparatus to a network or computer and that can transmit and receive data communication signals. The memory 670 can include a random access memory, a read only memory, an optical memory, a subscriber identity module memory, a flash memory, a removable memory, a hard drive, a cache, or any other memory that can be coupled to a wireless communication device. The apparatus 600 can include all or a portion of the illustrated elements.

The apparatus 600 or the controller 620 may implement any operating system, such as Microsoft Windows®, UNIX, or LINUX, Android, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an electronic device and implementing the disclosed embodiments.

Embodiments can provide for a system and apparatus to enable infrared emission in portable electronic device displays and other device displays. The apparatus 100 can emit infrared light for infrared illumination, for eye tracking, for gesture recognition, for detecting touches on a touchscreen, for pulse oximetry, and for other functions. Embodiments can also enable an integrated display design that works in both visible and infrared spectrum that can be used for mobile device applications. Embodiments can additionally be efficient to implement because they can be compatible with current LCD and other display designs and their manufacturing processes.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
a display backlight light source that includes a bottom reflector and a light guide panel configured to emit light;
an infrared and visible light conversion layer optically coupled to the display backlight light source, where the infrared and visible light conversion layer is configured to convert the light emitted from the display backlight light source into infrared light and at least some visible light, and to emit the infrared light along with the at least some visible light;
a color filter layer optically coupled on an opposite side of the infrared and visible light conversion layer with respect to the display backlight light source, wherein the color filter layer is configured to pass the infrared light and the at least some visible light emitted from the infrared and visible light conversion layer and through at least some of the color filter layer, and wherein the color filter layer includes at least a red light filter that is configured to pass red light and also the infrared light;
a liquid crystal display layer optically coupled to the display backlight light source, wherein the liquid crystal display layer includes a plurality of liquid crystal elements that are configured to shutter at least the infrared light emitted from the infrared and visible light conversion layer at different times and at different locations of the liquid crystal display layer;
one or more brightness enhancement film layers located between the infrared and visible light conversion layer and the liquid crystal display layer;
a diffuser layer located between the one or more brightness enhancement film layers and the liquid crystal display layer; and
a switch layer, distinct from the liquid crystal display layer, and located between the diffuser layer and the liquid crystal display layer, wherein the switch layer selectively activates or deactivates one or more of the plurality of liquid crystal elements to shutter at least the infrared light.

2. The apparatus of claim 1, wherein the infrared and visible light conversion layer emits a spectrum of light with peaks in red, green, blue, and infrared wavelengths.

3. The apparatus of claim 1, wherein the infrared and visible light conversion layer comprises a quantum dot layer that converts light from the display backlight light source to the infrared light and the at least some visible light, wherein the quantum dot layer includes a first plurality of quantum dots each having a first size, wherein the quantum dot layer further includes a second plurality of quantum dots each having a second size different from the first size, and wherein the first plurality of quantum dots and the second plurality of quantum dots respectively the light from the display backlight light source into different wavelengths.

4. The apparatus of claim 1, wherein the display backlight light source comprises one of a display backlight white light source that emits white light, a display backlight blue light source that emits blue light, or a display backlight ultraviolet light source that emits ultraviolet light.

5. The apparatus of claim 1,
wherein the apparatus further comprises:
a front polarizer layer optically coupled to an opposite side of the liquid crystal display layer with respect to the display backlight light source; and
a back polarizer layer optically coupled between the liquid crystal display layer and the display backlight light source.

6. The apparatus of claim 1, wherein the infrared and visible light conversion layer includes infrared filtering elements only at selected locations in the infrared and visible light conversion layer to emit the infrared light at the selected locations and to emit the at least some visible light at other locations in the infrared and visible light conversion layer.

7. The apparatus of claim 1, wherein the color filter layer includes color filter pixels and a black matrix that blocks visible light and emits the infrared light in between the color filter pixels.

8. An apparatus comprising:
a display backlight light source that includes a bottom reflector and a light guide panel that is configured to emit light;
an infrared and visible light conversion layer optically coupled to the display backlight light source, where the infrared and visible light conversion layer is configured to convert the light emitted from the display backlight light source into infrared light and at least some visible light, and to emit the infrared light along with the at least some visible light;
a color filter layer optically coupled on an opposite side of the infrared and visible light conversion layer with respect to the display backlight light source, where the color filter layer is configured to pass the infrared light and the at least some visible light emitted from the infrared and visible light conversion layer and through at least some of the color filter layer, and wherein the color filter layer includes at least a red light filter that is configured to pass red light and also the infrared light;
a liquid crystal display layer optically coupled to the display backlight light source, the liquid crystal display layer including a plurality of liquid crystal elements that are configured to shutter light emitted from at least one of the display backlight light source or the infrared and visible light conversion layer;
one or more brightness enhancement film layers located between the infrared and visible light conversion layer and the liquid crystal display layer;
a diffuser layer located between the one or more brightness enhancement film layers and the liquid crystal display layer; and
a switch layer, distinct from the liquid crystal display layer, and located between the diffuser layer and the liquid crystal display layer, wherein the switch layer selectively activates or deactivates one or more of the plurality of liquid crystal elements;
a front polarizer layer optically coupled to an opposite side of the liquid crystal display layer with respect to the display backlight light source; and
a back polarizer layer optically coupled between the liquid crystal display layer and the display backlight light source.

9. The apparatus of claim 8, wherein the infrared and visible light conversion layer comprises a quantum dot layer that converts light from the display backlight light source to the infrared light and the at least some visible light, wherein the quantum dot layer includes a first plurality of quantum dots each having a first size, wherein the quantum dot layer further includes a second plurality of quantum dots each having a second size different from the first size, and wherein the first plurality of quantum dots and the second plurality of quantum dots respectively the light from the display backlight light source into different wavelengths.

10. The apparatus of claim 8, wherein the infrared and visible light conversion layer includes infrared filtering elements only at selected locations in the infrared and visible light conversion layer to emit the infrared light at the selected locations and to emit the at least some visible light at other locations in the infrared and visible light conversion layer.

11. The apparatus of claim 8, wherein the color filter layer includes color filter pixels and a black matrix that blocks visible light and emits the infrared light in between the color filter pixels.

12. An apparatus comprising:
a controller configured to control operations of the apparatus; and
a display coupled to the controller, the display comprising:
  a display backlight light source that includes a bottom reflector and a light guide panel configured to emit light;
  an infrared and visible light conversion layer optically coupled to the display backlight light source, where the infrared and visible light conversion layer is configured to convert the light from the display backlight light source into infrared light and at least some visible light, and to emit the infrared light along with the at least some visible light;
  a color filter layer optically coupled on an opposite side of the infrared and visible light conversion layer with respect to the display backlight light source, where the color filter layer is configured to pass the infrared light and the at least some visible light emitted from the infrared and visible light conversion layer and through at least some of the color filter layer, and wherein the color filter layer includes at least a red light filter that is configured to pass red light and also the infrared light;
  a liquid crystal display layer optically coupled to the display backlight light source, the liquid crystal display layer including a plurality of liquid crystal elements that are configured to shutter light emitted from at least one of the display backlight light source or the infrared and visible light conversion layer;
  one or more brightness enhancement film layers located between the infrared and visible light conversion layer and the liquid crystal display layer;
  a diffuser layer located between the one or more brightness enhancement film layers and the liquid crystal display layer; and
  a switch layer, distinct from the liquid crystal display layer, and located between the diffuser layer and the liquid crystal display layer, wherein the switch layer selectively activates or deactivates one or more of the plurality of liquid crystal elements;
  a front polarizer layer optically coupled to an opposite side of the liquid crystal display layer with respect to the display backlight light source; and
  a back polarizer layer optically coupled between the liquid crystal display layer and the display backlight light source.

13. The apparatus of claim 12, further comprising a transceiver coupled to the controller, wherein the transceiver is configured to transmit and receive radio frequency wireless communication signals.

14. The apparatus of claim 1, wherein the color filter layer further includes a green light filter and a blue light filter, the green light filter being configured to pass green light but not the infrared light, and the blue light filter being configured to pass blue light but not the infrared light.

15. The apparatus of claim 8, wherein the color filter layer further includes a green light filter and a blue light filter, the green light filter being configured to pass green light but not the infrared light, and the blue light filter being configured to pass blue light but not the infrared light.

16. The apparatus of claim 12, wherein the color filter layer further includes a green light filter and a blue light filter, the green light filter being configured to pass green light but not the infrared light, and the blue light filter being configured to pass blue light but not the infrared light.

* * * * *